United States Patent
Lindner et al.

(10) Patent No.: US 10,620,991 B1
(45) Date of Patent: Apr. 14, 2020

(54) WORKLOAD MIGRATION IN MULTI-CLOUD ENVIRONMENTS

(71) Applicant: Virtustream IP Holding Company LLC, Bethesda, MD (US)

(72) Inventors: Maik A. Lindner, Marietta, GA (US); Eloy F. Macha, Las Cruces, NM (US)

(73) Assignee: VirtuStream IP Holding Company, Bethesda, MD (US)

( * ) Notice: Subject to any disclaimer, the term of this patent is extended or adjusted under 35 U.S.C. 154(b) by 144 days.

(21) Appl. No.: 15/884,767

(22) Filed: Jan. 31, 2018

(51) Int. Cl.
 - *G06F 9/46* (2006.01)
 - *G06F 9/48* (2006.01)
 - *G06F 9/50* (2006.01)

(52) U.S. Cl.
 CPC .......... *G06F 9/4856* (2013.01); *G06F 9/5077* (2013.01)

(58) Field of Classification Search
 None
 See application file for complete search history.

(56) References Cited

U.S. PATENT DOCUMENTS

| | | | | |
|---|---|---|---|---|
| 2009/0265568 A1* | 10/2009 | Jackson | ............... | G06F 1/3203 713/320 |
| 2010/0094948 A1* | 4/2010 | Ganesh | ............... | G06F 9/4856 709/212 |
| 2011/0258320 A1* | 10/2011 | Jackson | ............... | H04L 67/1008 709/226 |
| 2012/0054771 A1* | 3/2012 | Krishnamurthy | ..... | G06F 9/4881 718/105 |
| 2012/0185913 A1* | 7/2012 | Martinez | ................. | G06F 9/455 726/1 |
| 2012/0304179 A1* | 11/2012 | Devarakonda | ......... | G06Q 10/00 718/102 |
| 2013/0285433 A1* | 10/2013 | Yamada | ................. | B60N 2/995 297/423.3 |

* cited by examiner

*Primary Examiner* — Diem K Cao
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The processing platform is configured to implement at least a portion of at least a first cloud-based system. The processing platform further comprises a workload profiler configured to create an initial profile for a workload in response to a user migration request, a workload transformation engine configured to transform the initial profile into a multi-cloud migration profile, wherein the multi-cloud migration profile comprises a plan for migrating the workload, a workload data bus configured to migrate data pertaining to the workload in accordance with the multi-cloud migration profile, and a service transition bus configured to migrate one or more services pertaining to the workload in accordance with the multi-cloud migration profile.

20 Claims, 7 Drawing Sheets

WORKLOAD MIGRATION IN MULTI-CLOUD ENVIRONMENTS

FIELD

The field relates generally to information processing systems, and more particularly to migration techniques in such systems.

BACKGROUND

Information processing systems increasingly utilize reconfigurable virtual resources to meet changing user needs. For example, cloud computing and storage systems implemented using virtual machines have been widely adopted. Such cloud-based systems include, for example, Amazon Web Services (AWS), Google Cloud Platform (GCP), and Microsoft Azure. Despite the widespread availability of these and numerous other private, public and hybrid cloud offerings, there exists a significant problem in conventional practice in that there is no adequate mechanism available for efficiently migrating workloads across multiple cloud-based systems. Existing cloud-based migration approaches are commonly limited to focusing on single aspects of an application stack and are significantly time- and labor-intensive, often resulting in service interruptions. Moreover, such limitations in conventional approaches can effectively result in enterprises and users being limited and/or locked-in to a single-cloud infrastructure for increasingly sophisticated workloads. In conventional approaches, such limitations can be overcome only with tremendous and burdensome migration efforts due to cloud vendor-specific information technology (IT) system layouts and/or deployment patterns.

SUMMARY

Illustrative embodiments of the present invention provide information processing systems configured to carry out workload migration in multi-cloud environments.

In one embodiment, an apparatus comprises a processing platform that includes a plurality of processing devices each comprising a processor coupled to a memory. The processing platform is configured to implement at least a portion of at least a first cloud-based system. The processing platform further comprises a workload profiler configured to create an initial profile for at least a portion of a workload in response to a user request to migrate the at least a portion of the workload from the first cloud-based system to one or more additional cloud-based systems, wherein the initial profile describes one or more system-related aspects of the at least a portion of the workload and one or more enterprise-related aspects of the at least a portion of the workload. The processing platform also comprises a workload transformation engine configured to transform the initial profile into a multi-cloud migration profile, wherein the multi-cloud migration profile comprises a plan for migrating the at least a portion of the workload from the first cloud-based system to at least one identified cloud-based system among the one or more additional cloud-based systems while maintaining the one or more system-related aspects of the at least a portion of the workload and the one or more enterprise-related aspects of the at least a portion of the workload, and wherein the plan is based on the initial profile, one or more attributes of each of the one or more additional cloud-based systems, and one or more user inputs related to multi-cloud deployment of the at least a portion of the workload. Additionally, the processing platform comprises a workload data bus configured to migrate data pertaining to the at least a portion of the workload from the first cloud-based system to the at least one identified cloud-based system in accordance with the multi-cloud migration profile, and a service transition bus configured to migrate one or more services from the first cloud-based system to the at least one identified cloud-based system in accordance with the multi-cloud migration profile, wherein the one or more services comprise one or more services provided by one or more service providers, and wherein the one or more services include one or more information sets detailing one or more aspects of the at least a portion of the workload.

Illustrative embodiments can provide significant advantages relative to conventional cloud-based migration arrangements. For example, challenges associated with the limitations of time- and labor-intensive existing approaches are overcome through abstracting the multi-cloud placement and execution of a workload (or a portion thereof), enabling consistent service delivery. Such embodiments can include maintaining workload-related datasets in synchronization between various locations and across various platforms. Additionally, such embodiments can enable users to continue to interact with relevant systems and/or applications during a multi-cloud migration without experience service interruptions. Further one or more embodiments of the invention described herein can include implementing a multi-cloud management framework that manages workloads across a multi-cloud environment, wherein such management includes, but is not limited to, services, infrastructure, and platform service components.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
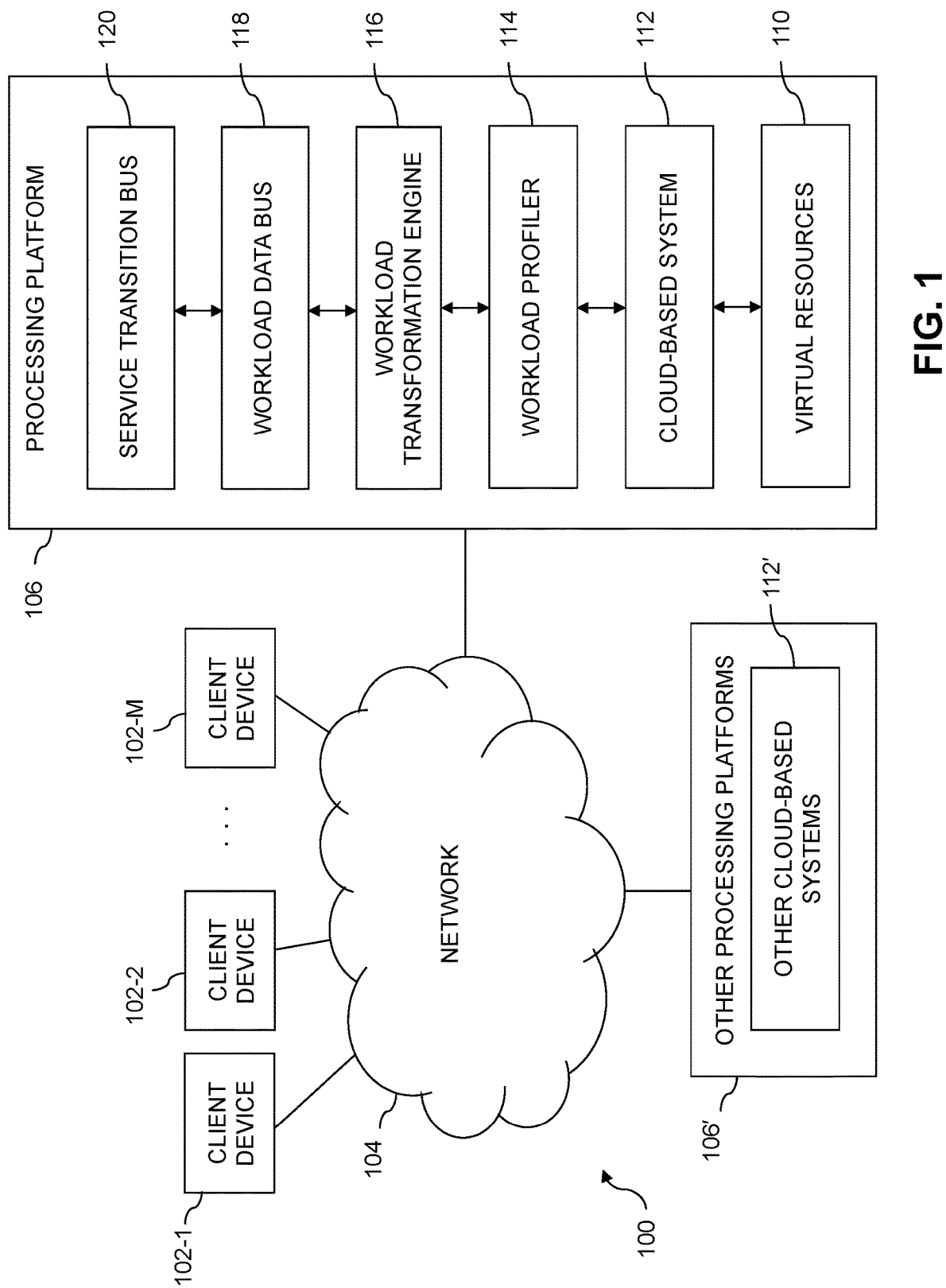
FIG. 1 is a block diagram of an information processing system configured for multi-cloud management workload migration in an illustrative embodiment.

FIG. 1 shows an information processing system 100 configured in accordance with an illustrative embodiment of the present invention. The information processing system 100 comprises a plurality of client devices 102-1, 102-2, ... 102-M coupled via a network 104 to a processing platform 106 (also referred to herein as a migration smart hub).

The client devices 102 in this embodiment can comprise, for example, desktop, laptop or tablet computers, mobile telephones, or other types of processing devices capable of communicating with the processing platform 106 over the network 104. Clients associated with the respective client devices 102 are assumed to run respective sets of client applications utilizing corresponding sets of virtual resources 110 of at least one cloud-based system 112 provided by the processing platform 106. For example, such clients may be respective tenants of a cloud data center or other type of multi-tenant environment provided by the processing platform 106. These tenants or other clients are examples of what are more generally referred to herein as respective "users" of the processing platform 106. Such users are also intended to include customers of a cloud service provider.

In some embodiments, the virtual resources 110 comprise at least a portion of at least one cloud-based system. That can include, for example, a plurality of containers allocable to respective client applications under the control of the cloud-based system 112. Additional or alternative virtual resources that may be used in a given embodiment include virtual machines. For example, the virtual resources may comprise a plurality of virtual machines allocable to respective ones of the client applications under the control of the cloud-based system 112. Various combinations of containers, virtual machines and other virtual resources may be used in other embodiments. For example, virtual resources may comprise containers running in virtual machines.

The network 104 over which the client devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as Wi-Fi or WiMAX, or various portions or combinations of these and other types of communication networks.

The processing platform 106 is assumed to include a plurality of processing devices each having a processor coupled to a memory, and is configured to implement the virtual resources 110 of the cloud-based system 112 for use by client applications.

The processing platform 106 further comprises a workload profiler 114, a workload transformation engine 116, a workload data bus 118 and a service transition bus 120, each associated with the cloud-based system 112. The cloud-based system 112 is also referred to herein as simply a "cloud." It is to be appreciated that this arrangement depicted in FIG. 1 is merely one example, and the workload profiler 114, workload transformation engine 116, workload data bus 118 and service transition bus 120 can be associated, separately or in combination, with one or more additional cloud-based systems.

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private clouds and thus may include various combinations of on-premises and off-premises portions.

The workload profiler 114 is configured to create an initial profile for a workload in response to a user request to migrate the workload from the first cloud-based system to one or more additional cloud-based systems, wherein the initial profile describes one or more system-related aspects of the workload and one or more enterprise-related aspects of the workload. The workload transformation engine 116 is configured to transform the initial profile into a multi-cloud migration profile, wherein the multi-cloud migration profile includes a plan for migrating the workload from the first cloud-based system to at least one identified cloud-based system among the additional cloud-based systems while maintaining the system-related aspects and the enterprise-related aspects of the workload, and wherein the plan is based on the initial profile, one or more attributes of each of the additional cloud-based systems, and one or more user inputs related to multi-cloud deployment of the workload.

Also, the workload data bus 118 is configured to migrate data pertaining to the workload from the first cloud-based system to the at least one identified cloud-based system in accordance with the multi-cloud migration profile. Further, the service transition bus 120 is configured to migrate one or more services from the first cloud-based system to the at least one identified cloud-based system in accordance with the multi-cloud migration profile, wherein the services include one or more services provided by one or more service providers, and wherein the services include one or more information sets detailing aspects of the workload.

As used herein, a "workload" refers to an amount of processing that a computing device has been tasked with doing at a given time. For example, a workload can include a software application or a set of software applications which have a defined amount of compute, storage and related items assigned thereto. Additionally, workload-related datasets can include, but are not limited to, the compute processing requirements for a given workload, the compute storage requirements for a given workload, and data-interface connections interacting with the given workload from one or more internal and/or external sources.

An exemplary process utilizing workload profiler 114, workload transformation engine 116, workload data bus 118 and service transition bus 120 of the processing platform 106 in information processing system 100 will be described in more detail with reference to the flow diagram of FIG. 5.

Also, by way of example, in some embodiments, a different cloud-based system comprises another cloud-based system implemented with cloud-based system 112 on the processing platform 106. Alternatively, the different cloud-based system can comprise another cloud-based system 112' implemented on a different processing platform 106' coupled to the network 104.

It is to be appreciated that the particular processing platform configuration illustrated in the FIG. 1 embodiment is presented by way of example only, and that other embodiments can utilize other arrangements of additional or alternative components. For example, functionality disclosed herein as being associated with two or more separate components can in other embodiments be combined into a single component.

A more particular example of an additional component that can be included in the processing platform 106 is a resource abstraction layer. Such a resource abstraction layer may be associated with the cloud-based system 112 and may comprise one or more resource abstraction frameworks such as a Mesos framework or a Cloud Foundry Diego framework. A given such framework can be configured to abstract away underlying virtual resources 110 from client applications that utilize those virtual resources.

As mentioned previously, the virtual resources 110 implemented by the processing platform 106 illustratively comprise containers. Such containers are more particularly assumed to comprise respective Docker containers or other types of Linux containers (LXCs). In embodiments that utilize containers, the processing platform 106 illustratively comprises a plurality of container host devices each implementing one or more of the containers. Each of the container host devices illustratively comprises at least one processor coupled to a memory. Such container host devices are examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with the cloud-based system 112.

The processing platform 106 can also incorporate one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates additional functionality, such as management and orchestration functionality. The management and orchestration functionality may be implemented, for example, in the cloud-based system 112 or components thereof, and can be provided, for example, using components such as VCE Vision™ Intelligent Operations Software, or other types of management and orchestration components, including components from Pivotal Cloud Foundry, or various combinations of multiple ones of these or other components.

In some embodiments, certain functionality of the cloud-based system 112 is made available to a user by a cloud service provider on a Software-as-a-Service (SaaS) basis. Such users may be associated with respective ones of the client devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 6 and 7. A given such processing platform comprises at least one processing device comprising a processor coupled to a memory, and the processing device may be implemented at least in part utilizing one or more virtual machines or other virtualization infrastructure. Additionally, the operation of the information processing system 100 will be described in further detail with reference to the flow diagram of FIG. 5.

Figure 2:
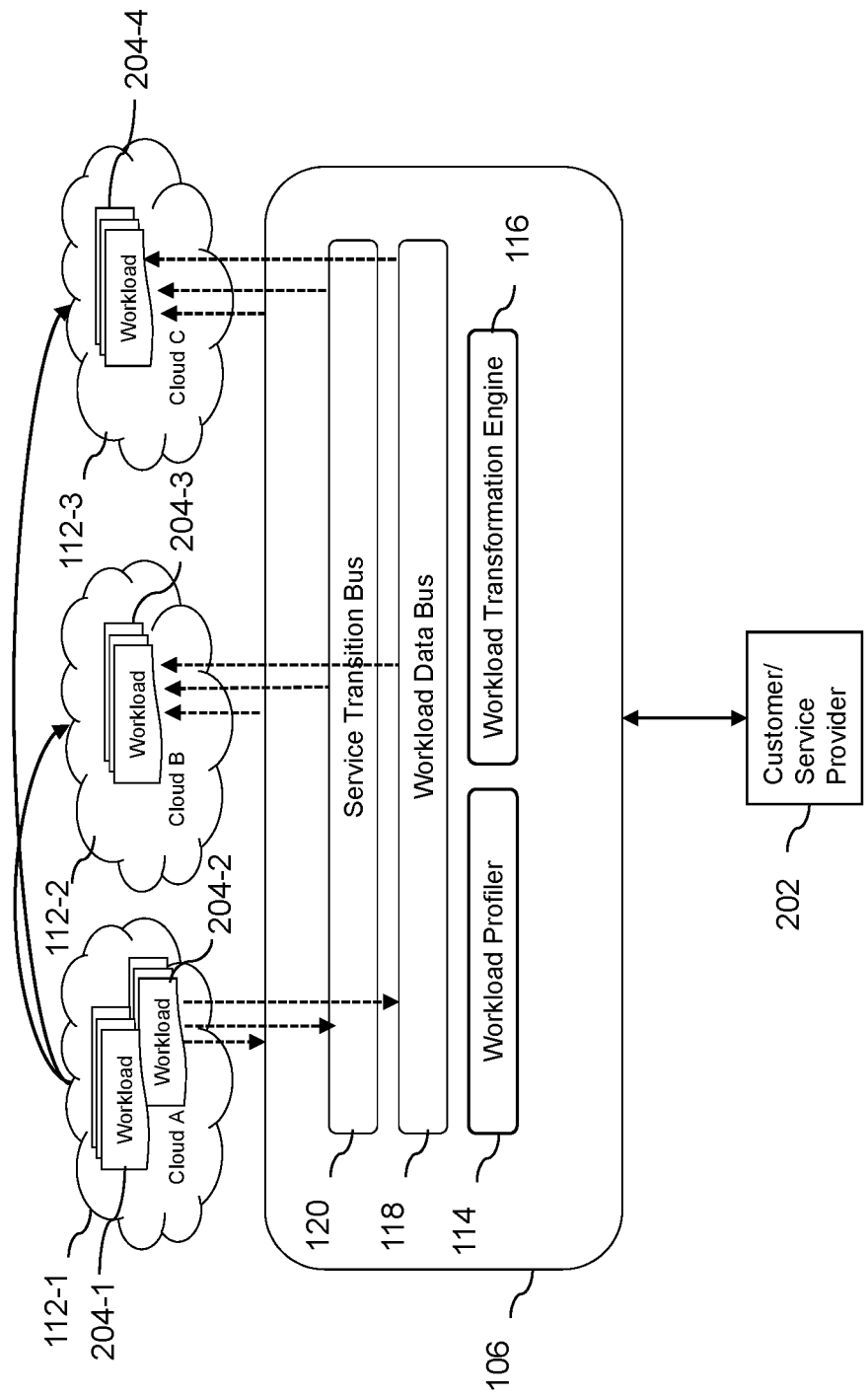
FIG. 2 shows another illustrative embodiment of an information processing system configured for multi-cloud management workload migration in an illustrative embodiment.

FIG. 2 shows another illustrative embodiment of an information processing system configured for multi-cloud management workload migration in an illustrative embodiment. By way of illustration, FIG. 2 depicts a customer/user or service provider 202 (which can be human actors or automated entities) interacting with processing platform/migration smart hub 106. As also depicted in FIG. 1, the migration smart hub 106 includes workload profiler 114, workload transformation engine 116, workload data bus 118, and service transition bus 120. FIG. 2 also depicts cloud A 112-1 (which includes workloads 204-1 and 204-2), cloud B 112-2 (which includes workload 204-3) and cloud C 112-3 (which includes workload 204-4).

The example embodiment depicted in FIG. 2 illustrates the seamless workload migration (pertaining to workload 204-2) of customer data and applications from cloud A 112-1 to cloud B 112-2 and cloud C 112-3. The workload migration is handled through integration of the service transition bus 120 and the workload data bus 118, and coordination/orchestration through the migration smart hub 106. The service transition bus 120 handles the migration of services (including tools and/or toolsets) needed to support workload 204-2 from cloud A 112-1 to cloud B 112-2 and cloud C 112-3. The workload data bus 118 handles the integration and data movement of workload 204-2 data from cloud A 112-1 to cloud B 112-2 and cloud C 112-3, ensuring no data loss and no down-time and/or service interruption.

The migration smart hub/processing platform 106 orchestrates the handling of the service transition and the workload data. Additionally, the migration smart hub 106 uses the workload profiler 114 (which can include metadata descriptions pertaining to workload 204-2) to create a technical and business profile of workload 204-1, and uses the workload transformation engine 116 to transform this as-is profile into a to-be profile, which can include one or more (or all) technical and business implications of the migration.

Figure 3:
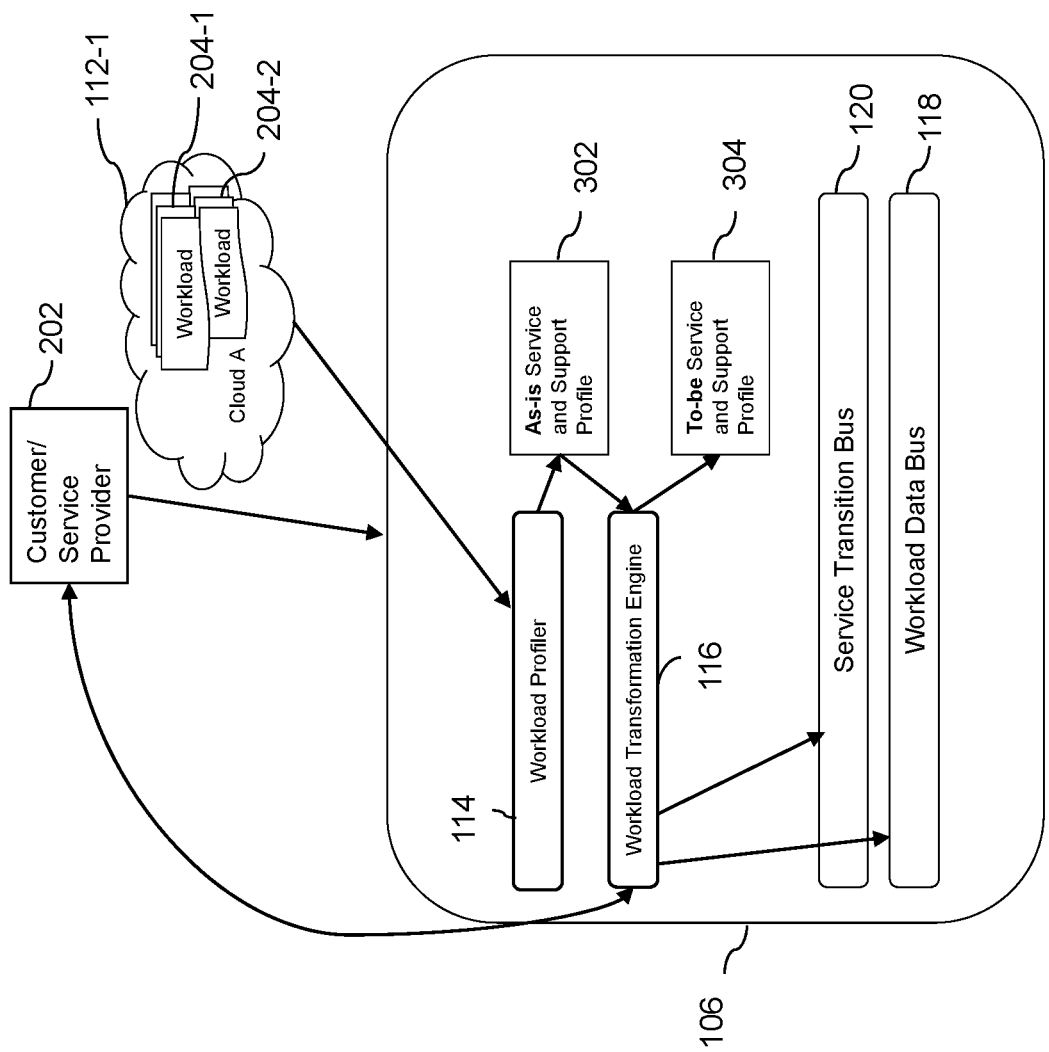
FIG. 3 shows another illustrative embodiment of an information processing system configured for cloud workload profiling in an illustrative embodiment.

FIG. 3 shows another illustrative embodiment of an information processing system configured for cloud workload profiling in an illustrative embodiment. By way of illustration, FIG. 3, similar to FIG. 2, depicts customer/user or service provider 202, cloud A 112-1 (which includes workloads 204-1 and 204-2), and processing platform/migration smart hub 106, which includes workload profiler 114, workload transformation engine 116, workload data bus 118, and service transition bus 120. As more specifically illustrated in this example embodiment, FIG. 3 depicts the customer/user or service provider 202 requesting a cloud migration from the migration smart hub 106. Based on this request, the workload profiler 114 obtains and/or ingests data pertaining to workload 204-1 and/or 204-2 from cloud A 112-1. Using the ingested data, the workload profiler 114 creates an as-is service and support profile 302 for workload 204-1 and/or 204-2. Such a profile 302 can include, for example, a description of the customer's subscribed services for the target workload, and a description of the customer's key performance indicators (KPIs), service level agreements (SLAs), service level objectives (SLOs), and/or other service delivery metrics that the target workload is under. Additionally, profile 302 can also include, for example, a description of the customer's integration, interaction, and/or dependencies with other workloads (which can include customer feedback, categorizing those with a higher priority in interaction requirements), a description of the customer's compliance and security requirements per the target workload, a description of the customer's deployment policies for the target workload, and landscape lifecycle data (which can include backup data, update data, upgrade data, etc.).

Referring again to FIG. 3, the as-is service and support profile 302 is provided to the workload transformation engine 116, which uses the as-is profile 302 to generate a to-be service and support profile 304, which determines multi-cloud placement and one or more support models to be used in connection with the migration. The to-be profile 304 can then be presented to the customer/service provider 202 for technical and/or business modification and/or approval. Once ultimately approved by the customer/service provider 202, the to-be profile 304 is used by the workload data bus 118 and the service transition bus 120 to carry out the migration.

In one or more embodiments of the invention, the to-be profile 304, once approved by the customer/service provider 202, functions as the build plan for the multi-cloud environment. In such an embodiment, the to-be profile 304 can be based on the as-is service and support profile 302 as well as one or more expectations toward the new deployment from the customer/service provider 202 (such as, for example, the compliance level or end-user response time can be adjusted during the transformation). Accordingly, the workload transformation engine 116 can identify an optimal migration approach for an optimal cloud target mix. Further, in one or more embodiments of the invention, the as-is profile 302 as well as the to-be profile 304 could change due to evolving user decisions.

By way merely of illustration and not limitation, consider the following use case example for implementation of one or more embodiments of the invention. In such an example, assume that a customer has various workloads spread across public clouds, private clouds, and/or on premise locations. Additionally, the customer seeks to seamlessly move workloads in between various cloud destinations (for example, due to the customer's preferences, features/functions that the customer workloads could benefit from with placement of the workload in a prescribed location, etc.). Upon establishing the customer workload under multi-cloud management, the workload is then ready to be migrated, via the migration smart hub, through the use of the service transition bus, and the workload data bus. The customer elects an execution of migration, which triggers the migration smart hub to orchestrate the execution of the various workloads to one or more determined cloud destinations, while the customer continues to use all relevant applications without interruption.

Figure 4:
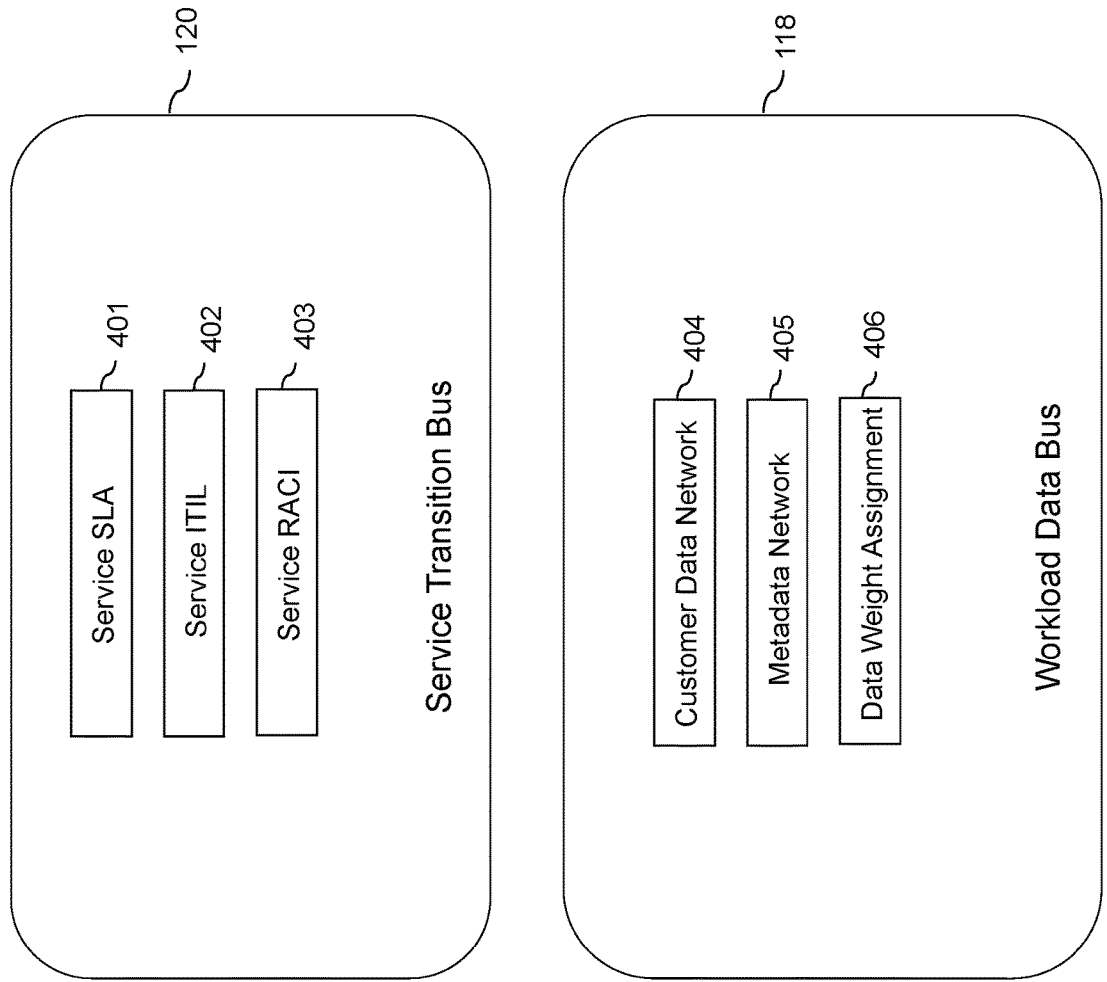
FIG. 4 shows another illustrative embodiment of a workload data bus and a service transition bus in an illustrative embodiment.

FIG. 4 shows another illustrative embodiment of workload data bus 118 and service transition bus 120 in an illustrative embodiment. By way of illustration, FIG. 4 depicts a framework representation of the workload data bus 118 and the service transition bus 120, such as also depicted in FIG. 1, FIG. 2, and FIG. 3. For example, as depicted in FIG. 4, the service transition bus 120 includes elements which can be used in conjunction with workload transformation engine 116 in support of migrating a service SLA 401, a service information technology infrastructure library (ITIL) 402, and a service responsibility assignment matrix (RACI) 403. Additionally, as depicted in FIG. 4, the workload data bus 118 describes the network components which are presented to the workload transformation engine 116, wherein such components can include a customer data network 404, a metadata network 405, and a data weight assignment component 406.

As noted herein, the operation of the information processing system 100 is described in further detail with reference to the flow diagram of the example embodiment of FIG. 5. The process as shown includes steps 500 through 510, and is suitable for use in the system 100 but is more generally applicable to other systems comprising a processing platform having cloud infrastructure representation functionality. Accordingly, references to components of the embodiment of FIG. 1 in the process description below should not be viewed as limiting in any way, as the disclosed process steps can be applied in a wide variety of other types of information processing systems.

In step 500, at least one processing platform is configured to include a plurality of processing devices each comprising a processor coupled to a memory. In the context of the FIG. 1 embodiment, information processing system 100 comprises multiple processing platforms 106 and 106' as illustrated in the figure. The one or more additional processing platforms 106' may be configured in substantially the same manner as the processing platform 106. Each such processing platform comprises virtual resources for use by client applications.

In step 502, at least a portion of at least a first cloud-based system is implemented within the processing platform. For example, with reference to the FIG. 1 embodiment, such a portion of at least a first cloud-based system can include virtual resources 110 of cloud-based system 112 implemented within the processing platform 106. As mentioned previously, such virtual resources illustratively comprise containers, virtual machines or combinations thereof. For example, in the context of the FIG. 1 embodiment, the virtual resources may comprise a plurality of containers allocable to respective client applications of the client devices 102 under the control of the cloud-based system 112. As another example, the virtual resources may comprise a plurality of virtual machines allocable to respective ones of the client applications of the client devices 102 under the control of the cloud-based system 112. Numerous other arrangements of virtual resources of various types and combinations can be utilized in other embodiments. For example, the virtual resources can include a plurality of virtual machines and a plurality of containers configured to run on at least a subset of the virtual machines.

Step 504 includes creating an initial profile for at least a portion of a workload in response to a user request to migrate the at least a portion of the workload from the first cloud-based system to one or more additional cloud-based systems, wherein the initial profile describes one or more system-related aspects of the at least a portion of the workload and one or more enterprise-related aspects of the at least a portion of the workload. Such a step can be carried out, for example, by workload profiler 114 in the FIG. 1 embodiment. The system-related aspects can include one or more compute system components, one or more storage system components, one or more network system components, and/or one or more connectivity components. Additionally, the system-related aspects can include a description of each of one or more user-subscribed services for the at least a portion of the workload, as well as lifecycle data related to the at least a portion of the workload. Such lifecycle data can include backup-related data, update-related data, and/or upgrade-related data.

The enterprise-related aspects can include a description one or more integrations between the at least a portion of the workload and one or more additional workloads, one or more interactions between the at least a portion of the workload and one or more additional workloads, and/or one or more dependencies of the at least a portion of the workload with respect to one or more additional workloads. Also, the enterprise-related aspects can include a user prioritization of the one or more integrations between the at least a portion of the workload and one or more additional workloads, the one or more interactions between the at least a portion of the workload and one or more additional workloads, and/or the one or more dependencies of the at least a portion of the workload with respect to one or more additional workloads. Further, the enterprise-related aspects can include a description of one or more compliance requirements associated with the at least a portion of the workload and/or one or more security requirements associated with the at least a portion of the workload, as well as a description of one or more deployment policies related to the at least a portion of the workload.

Step 506 includes transforming the initial profile into a multi-cloud migration profile, wherein the multi-cloud migration profile comprises a plan for migrating the at least a portion of the workload from the first cloud-based system to at least one identified cloud-based system among the one or more additional cloud-based systems while maintaining the one or more system-related aspects of the at least a portion of the workload and the one or more enterprise-related aspects of the at least a portion of the workload, and wherein the plan is based on the initial profile, one or more attributes of each of the one or more additional cloud-based systems, and one or more user inputs related to multi-cloud deployment of the at least a portion of the workload. Such a step can be carried out, for example, by workload transformation engine 116 in the FIG. 1 embodiment. The user inputs related to deployment can include, for example, a user selection of one or more additional cloud-based systems for migration.

In at least one embodiment of the invention, the workload transformation engine 116 can be further configured to output the multi-cloud migration profile to the user for feedback and/or approval, to transmit the multi-cloud migration profile to the workload data bus and the service transition bus upon receipt of approval from the user, and to modify the multi-cloud migration profile in response to feedback received from the user.

Step 508 includes migrating data pertaining to the at least a portion of the workload from the first cloud-based system to the at least one identified cloud-based system in accordance with the multi-cloud migration profile. Such a step can be carried out, for example, by workload data bus 118 in the FIG. 1 embodiment. The data pertaining to the at least a portion of the workload can include, for example, all datasets required by the at least a portion of the workload.

Step 510 includes migrating one or more services from the first cloud-based system to the at least one identified cloud-based system in accordance with the multi-cloud migration profile, wherein the one or more services comprise one or more services provided by one or more service providers, and wherein the one or more services include one or more information sets detailing one or more aspects of the at least a portion of the workload. Such a step can be carried out, for example, by service transition bus 120 in the FIG. 1 embodiment. The information sets can include a hosted information technology system, one or more service level agreements, one or more service level objectives, pricing information, service delivery information, service support information, one or more self-service capabilities, one or more service dependencies, data proximity information, and/or one or more key performance indicators.

Figure 5:
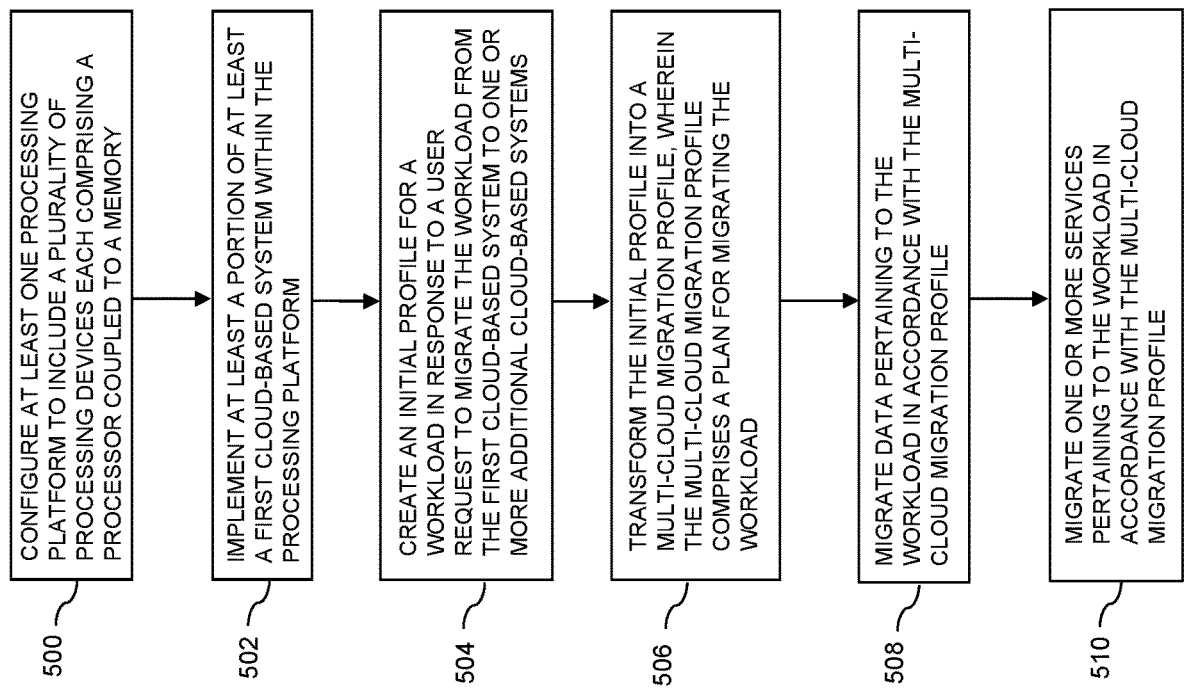
FIG. 5 is a flow diagram of a process for multi-cloud management workload migration in an illustrative embodiment.

The particular processing operations and other system functionality described in conjunction with the flow diagram of FIG. 5 are therefore presented by way of illustrative example only, and should not be construed as limiting the scope of the disclosure in any way. Alternative embodiments can use other types of processing operations involving cloud infrastructure representation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to carry out the techniques of one or more embodiments of the invention detailed herein.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of multi-cloud management workload migration as disclosed herein can provide a number of significant advantages relative to conventional arrangements.

For example, some embodiments can advantageously provide migration of services from a first cloud to a second cloud without a service interruption. Also, one or more embodiments can preclude users from being bound by and/or to a single cloud infrastructure. Such arrangements overcome the difficulties that would otherwise be associated with conventional cloud migration techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
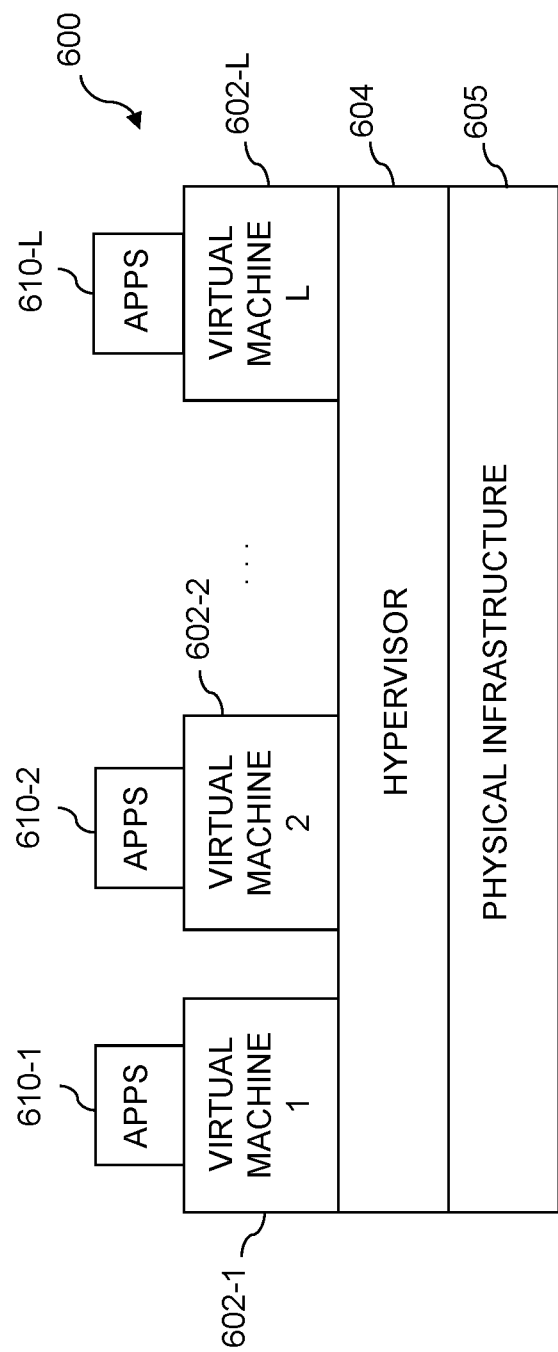
FIGS. 6 and 7 show examples of processing platforms that may be utilized to implement at least a portion of an information processing system in illustrative embodiments.
Figure 7:
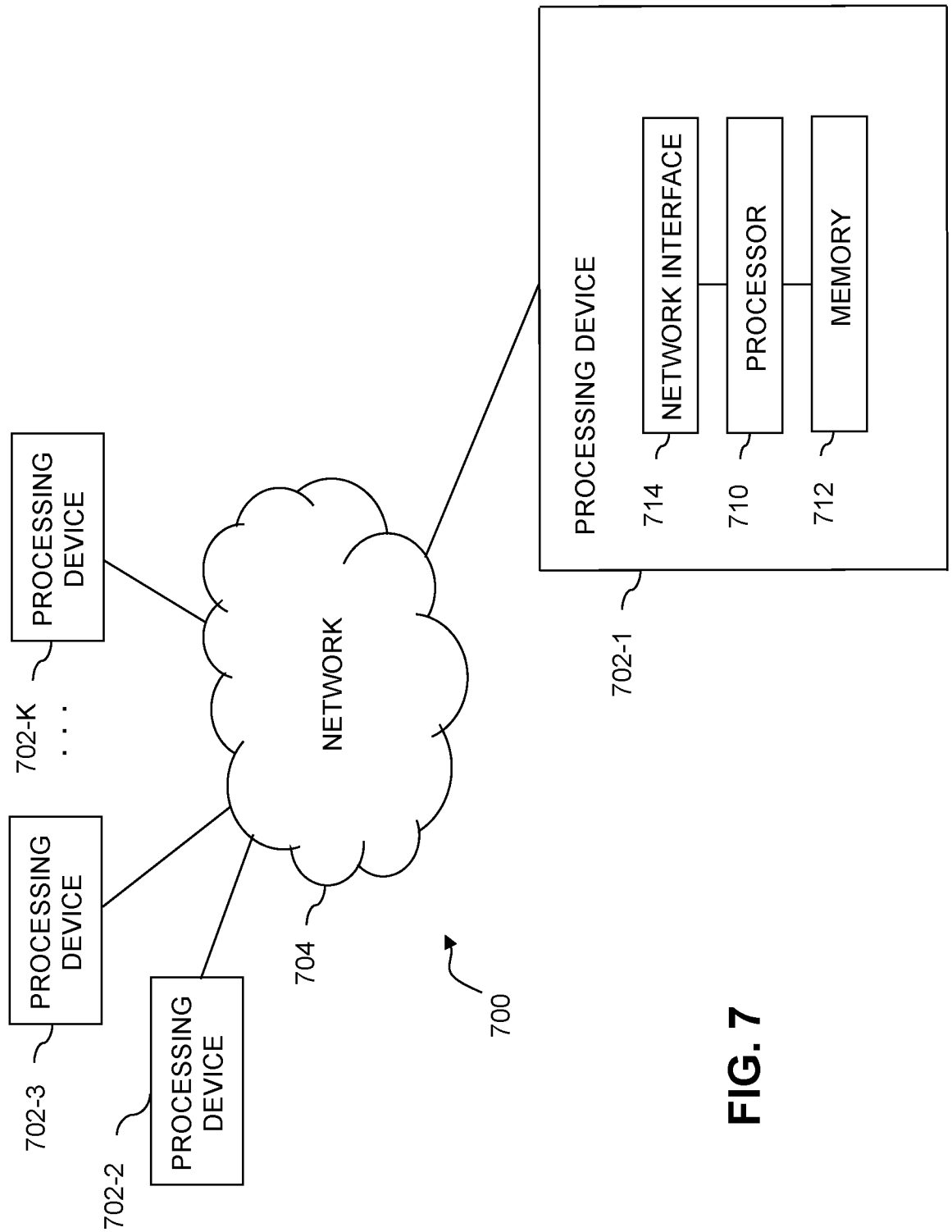

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide migration of user data and applications in a multi-cloud environment. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:

at least one processing platform comprising a plurality of processing devices each comprising a processor coupled to a memory;

the processing platform being configured to implement at least a portion of at least a first cloud-based system;

wherein the processing platform further comprises:

a workload profiler configured to create an initial profile for at least a portion of a workload in response to a user request to migrate the at least a portion of the workload from the first cloud-based system to one or more additional cloud-based systems, wherein the initial profile describes one or more system-related aspects of the at least a portion of the workload and one or more enterprise-related aspects of the at least a portion of the workload, wherein the one or more enterprise-related aspects comprise a user prioritization of one or more integrations between the at least a portion of the workload and one or more additional workloads, a user prioritization of one or more interactions between the at least a portion of the workload and one or more additional workloads, and a user prioritization of one or more dependencies of the at least a portion of the workload with respect to one or more additional workloads;

a workload transformation engine configured to transform the initial profile into a multi-cloud migration profile, wherein the multi-cloud migration profile comprises a plan for migrating the at least a portion of the workload from the first cloud-based system to at least one identified cloud-based system among the one or more additional cloud-based systems while maintaining the one or more system-related aspects of the at least a portion of the workload and the one or more enterprise-related aspects of the at least a portion of the workload, and wherein the plan is based on the initial profile, one or more attributes of each of the one or more additional cloud-based systems, and one or more user inputs related to multi-cloud deployment of the at least a portion of the workload;

a workload data bus configured to migrate data pertaining to the at least a portion of the workload from the first cloud-based system to the at least one identified cloud-based system in accordance with the multi-cloud migration profile; and a service transition bus configured to migrate one or more services from the first cloud-based system to the at least one identified cloud-based system in accordance with the multi-cloud migration profile, wherein the one or more services comprise one or more services provided by one or more service providers, and wherein the one or more services include one or more information sets detailing one or more aspects of the at least a portion of the workload.

2. The apparatus of claim 1, wherein the one or more system-related aspects comprise at least one of one or more compute system components, one or more storage system components, one or more network system components, and one or more connectivity components.

3. The apparatus of claim 1, wherein the one or more system-related aspects comprise a description of each of one or more user-subscribed services for the at least a portion of the workload.

4. The apparatus of claim 1, wherein the one or more information sets comprise at least one of a hosted information technology system, one or more service level agreements, one or more service level objectives, pricing information, service delivery information, service support information, one or more self-service capabilities, one or more service dependencies, data proximity information, and one or more key performance indicators.

5. The apparatus of claim 1, wherein the one or more enterprise-related aspects comprise a description of at least one of the one or more integrations between the at least a portion of the workload and one or more additional workloads, the one or more interactions between the at least a portion of the workload and one or more additional workloads, and the one or more dependencies of the at least a portion of the workload with respect to one or more additional workloads.

6. The apparatus of claim 1, wherein the one or more enterprise-related aspects comprise a description of at least one of one or more compliance requirements associated with the at least a portion of the workload and one or more security requirements associated with the at least a portion of the workload.

7. The apparatus of claim 1, wherein the one or more enterprise-related aspects comprise a description of one or more deployments policies related to the at least a portion of the workload.

8. The apparatus of claim 1, wherein the one or more system-related aspects comprise lifecycle data related to the at least a portion of the workload.

9. The apparatus of claim 1, wherein the workload transformation engine is further configured to output the multi-cloud migration profile to the user for at least one of feedback and approval.

10. The apparatus of claim 9, wherein the workload transformation engine is further configured to transmit the multi-cloud migration profile to the workload data bus and the service transition bus upon receipt of approval from the user.

11. The apparatus of claim 9, wherein the workload transformation engine is further configured to modify the multi-cloud migration profile in response to feedback received from the user.

12. The apparatus of claim 1, wherein the one or more user inputs related to deployment comprises a user selection of one or more additional cloud-based systems for migration.

13. The apparatus of claim 1, wherein the data pertaining to the at least a portion of the workload comprise all datasets required by the at least a portion of the workload.

14. A method comprising steps of:
creating an initial profile for at least a portion of a workload in response to a user request to migrate the at least a portion of the workload from the first cloud-based system to one or more additional cloud-based systems, wherein the initial profile describes one or more system-related aspects of the at least a portion of the workload and one or more enterprise-related aspects of the at least a portion of the workload, wherein the one or more enterprise-related aspects comprise a user prioritization of one or more integrations between the at least a portion of the workload and one or more additional workloads, a user prioritization of one or more interactions between the at least a portion of the workload and one or more additional workloads, and a user prioritization of one or more dependencies of the at least a portion of the workload with respect to one or more additional workloads;

transforming the initial profile into a multi-cloud migration profile, wherein the multi-cloud migration profile comprises a plan for migrating the at least a portion of the workload from the first cloud-based system to at least one identified cloud-based system among the one or more additional cloud-based systems while maintaining the one or more system-related aspects of the at least a portion of the workload and the one or more enterprise-related aspects of the at least a portion of the workload, and wherein the plan is based on the initial profile, one or more attributes of each of the one or more additional cloud-based systems, and one or more user inputs related to multi-cloud deployment of the at least a portion of the workload;

migrating data pertaining to the at least a portion of the workload from the first cloud-based system to the at least one identified cloud-based system in accordance with the multi-cloud migration profile; and migrating one or more services from the first cloud-based system to the at least one identified cloud-based system in accordance with the multi-cloud migration profile, wherein the one or more services comprise one or more services provided by one or more service providers, and wherein the one or more services include one or more information sets detailing one or more aspects of the at least a portion of the workload;

wherein the steps are implemented in at least one processing platform configured to include a plurality of processing devices each comprising a processor coupled to a memory; and wherein the processing platform is configured to implement at least a portion of at least the first cloud-based system.

15. The method of claim 14, further comprising outputting the multi-cloud migration profile to the user for at least one of feedback and approval.

16. The method of claim 15, further comprising modifying the multi-cloud migration profile in response to feedback received from the user.

17. The method of claim 14, wherein the one or more enterprise-related aspects comprise a description of at least one of the one or more integrations between the at least a portion of the workload and one or more additional workloads, the one or more interactions between the at least a portion of the workload and one or more additional workloads, and the one or more dependencies of the at least a portion of the workload with respect to one or more additional workloads.

18. A computer program product comprising a non-transitory processor-readable storage medium having stored therein program code of one or more software programs, wherein the program code when executed by a processing platform comprising a plurality of processing devices causes the processing platform:
to create an initial profile for at least a portion of a workload in response to a user request to migrate the at least a portion of the workload from the first cloud-based system to one or more additional cloud-based systems, wherein the initial profile describes one or more system-related aspects of the at least a portion of the workload and one or more enterprise-related aspects of the at least a portion of the workload, wherein the one or more enterprise-related aspects comprise a user prioritization of one or more integrations between the at least a portion of the workload and one or more additional workloads, a user prioritization of one or more interactions between the at least a portion of the workload and one or more additional workloads, and a user prioritization of one or more dependencies of the at least a portion of the workload with respect to one or more additional workloads;

to transform the initial profile into a multi-cloud migration profile, wherein the multi-cloud migration profile comprises a plan for migrating the at least a portion of the workload from the first cloud-based system to at least one identified cloud-based system among the one or more additional cloud-based systems while maintaining the one or more system-related aspects of the at least a portion of the workload and the one or more enterprise-related aspects of the at least a portion of the workload, and wherein the plan is based on the initial profile, one or more attributes of each of the one or more additional cloud-based systems, and one or more user inputs related to multi-cloud deployment of the at least a portion of the workload;

to migrate data pertaining to the at least a portion of the workload from the first cloud-based system to the at least one identified cloud-based system in accordance with the multi-cloud migration profile; and to migrate one or more services from the first cloud-based system to the at least one identified cloud-based system in accordance with the multi-cloud migration profile, wherein the one or more services comprise one or more services provided by one or more service providers, and wherein the one or more services include one or more information sets detailing one or more aspects of the at least a portion of the workload;

wherein the processing platform is configured to implement at least a portion of at least the first cloud-based system.

19. The computer program product of claim 18, wherein the program code further causes the processing platform:
to output the multi-cloud migration profile to the user for at least one of feedback and approval.

20. The computer program product of claim 19, wherein the program code further causes the processing platform:
to modify the multi-cloud migration profile in response to feedback received from the user.

\* \* \* \* \*